US009014845B2

(12) United States Patent
Babu et al.

(10) Patent No.: US 9,014,845 B2
(45) Date of Patent: Apr. 21, 2015

(54) ITEM VERIFICATION APPARATUS AND METHOD

(75) Inventors: Anil Venkata Krishna Babu, Andhra Pradesh (IN); Ranjeet Kumar Sahu, Orissa (IN); Gordon A. Forsyth, Perth & Kinross (GB); Andrew T. Anderson, Dundee (GB)

(73) Assignee: NCR Corporation, Duluth, GA (US)

( * ) Notice: Subject to any disclaimer, the term of this patent is extended or adjusted under 35 U.S.C. 154(b) by 780 days.

(21) Appl. No.: 12/288,694

(22) Filed: Oct. 22, 2008

(65) Prior Publication Data

US 2010/0100230 A1 Apr. 22, 2010

(51) Int. Cl.
*G06F 7/00* (2006.01)
*G07F 19/00* (2006.01)

(52) U.S. Cl.
CPC .............. *G07F 19/207* (2013.01); *G07F 19/20* (2013.01)

(58) Field of Classification Search
USPC ........ 700/213–216, 225; 235/375–381, 385.2
See application file for complete search history.

(56) References Cited

U.S. PATENT DOCUMENTS 4,166,945 A * 9/1979 Inoyama et al. .............. 235/379
6,073,837 A * 6/2000 Milne ........................... 235/379
6,273,413 B1 * 8/2001 Graef ........................... 271/3.14
6,371,368 B1 * 4/2002 Owens et al. ................. 235/379
6,400,276 B1 * 6/2002 Clark ............................ 340/640
6,516,998 B2 * 2/2003 Calder et al. .................. 235/381
6,619,545 B2 * 9/2003 Harris ........................... 235/381
6,726,097 B2 * 4/2004 Graef et al. ................... 235/379
6,981,637 B2 * 1/2006 Nagayoshi et al. ........... 235/379
7,011,201 B2 * 3/2006 Katou et al. .................. 194/350
7,121,461 B2 * 10/2006 Washington et al. ......... 235/379
7,143,065 B1 * 11/2006 Enright ........................... 705/43
7,229,012 B1 * 6/2007 Enright et al. ................ 235/379
7,249,113 B1 * 7/2007 Continelli et al. .............. 705/80
7,299,281 B1 * 11/2007 Wang et al. ................... 709/224
7,344,065 B1 * 3/2008 Graef ............................ 235/379
7,513,419 B1 * 4/2009 Crews et al. .................. 235/379
7,611,048 B1 * 11/2009 Warren et al. ................ 235/379
7,883,007 B1 * 2/2011 Crews et al. .................. 235/379
2004/0006539 A1 * 1/2004 Royer et al. ..................... 705/40
2004/0178258 A1 * 9/2004 Scarafile et al. .............. 235/379
2004/0260649 A1 * 12/2004 Kagehiro et al. ............... 705/43
2005/0010525 A1 * 1/2005 Ross et al. ....................... 705/43
2005/0073584 A1 * 4/2005 Enright et al. ................ 348/150
2005/0127590 A1 * 6/2005 Ugo et al. ........................ 271/96
2008/0110976 A1 * 5/2008 Utz et al. ....................... 235/379
2010/0042541 A1 * 2/2010 Kang et al. ...................... 705/42

* cited by examiner

*Primary Examiner* — Gene Crawford
*Assistant Examiner* — Kyle Logan
(74) *Attorney, Agent, or Firm* — Paul W. Martin; Joseph P. Mehrle

(57) ABSTRACT

A system for verifying whether an item retracted into a self-service terminal is the same item that was output from the self-service terminal, wherein the signature data sets generated prior to output and following retraction of the item are compared. A method of verifying whether an item retracted into a self-service terminal is the same item that was output from the self-service terminal is also disclosed.

20 Claims, 5 Drawing Sheets

ITEM VERIFICATION APPARATUS AND METHOD

FIELD OF THE INVENTION

This invention relates to an item verification apparatus and method. More particularly, but not exclusively, it relates to a retracted item verification apparatus and method. Even more particularly, but not exclusively, it relates to a retracted item verification apparatus and method for use with a self-service terminal.

BACKGROUND TO THE INVENTION

Common examples of SSTs include automated teller machines (ATMs), information kiosks, financial services centers, bill payment kiosks, lottery kiosks, postal services machines, check-in and check-out terminals such as those used in the hotel, car rental, and airline industries, retail self-checkout terminals, vending machines, and the like.

When an item is dispensed by a self-service terminal, for example cash dispensed by an automated teller machine (ATM) it is offered for collection by a user. Should the item not be collected by the user it is retracted back into the self-service terminal where it is stored for subsequent verification.

In the case of many ATMs, the location of cash dispensed but not collected by a user is monitored by a global bill recycling unit (GBRU). Typically, retracted cash is placed into a retract bin. Currently, the user who has not collected their cash must request that their account be credited with the correct amount. In order to verify that the cash was dispensed to that specific user the contents of the retract bin must be checked and cross-referenced with an event log, journal, that details the dispense events carried out by the ATM. Once verification of the cash being dispensed and not collected has been made, the user's account is credited with the amount not collected. This is time consuming and laborious for both the customer and the financial institution running the ATM.

In the case of a self-service deposit terminal a bunch of deposited items, for example cheques or giros, are entered at a deposit slot by a user. The deposited items may be returned, dispensed, to the user for any number of reasons. Examples of why media may need to be re-output to the user comprise if the input media is too short or too long, if the input media is dog eared or stained and if image quality of the scan of the input is poor. In addition the user may select to return an item after insertion, or a host or cheque processing application could decide to return an item for business reasons for example the input media has too high or too low a value, the media may not be valid in location where deposit is being attempted (e.g. a US$ deposit in Europe), the cheque may be from a financial institution or business not supported by the receiving financial institution.

If the deposited items are not collected by the user they are often retracted into the device to allow the deposit terminal to remain in use by other users.

There are a number of difficulties associated with the retraction of non-collected items common to both self-service dispense and deposit terminals. These include, but are not limited to, the substitution of some, or all, of the items dispensed by the self-service terminal by the user, or a third party. Additionally, or alternatively, some of the dispensed items may be removed by the user, or a third party, when offered for collection by the user. This results in the self-service terminal being unable to report the status of each of the dispensed items accurately. In particular the location of each dispensed item cannot be reported accurately.

Certain item handling specifications, for example the publicly available CEN XFS IPM specification, the contents of which are incorporated herein by reference, have requirements that the media location of each item is reported accurately. However, where substitution, or removal, of an item is possible the media location must be reported as unknown, or inaccurate, as the user, or a third party, has had access to the dispensed items.

SUMMARY OF THE INVENTION

According to a first aspect of the present invention there is provided an item verification apparatus comprising:

a processor;

a media handling unit; and a signature unit;

the signature unit being arranged to generate first signature data associated with an item to be output via the media handling unit, the first signature data characterizing the item to be presented to a user, the signature unit being arranged to pass the first signature data to the processor;

the media handling unit being arranged to output the item such that the item is collectable by a user;

the processor being arranged to issue an instruction to the media handling unit to retract the item upon the expiry of a pre-determined timeout period;

the media handling unit being arranged to retract the, or an, item such that the, or an, item cannot be collected by the user upon receipt of said instruction; wherein the signature unit is arranged to generate second signature data, the second signature data characterizing the, or an, item retracted, the second signature unit being arranged to pass the second signature data to the processor; and the processor is arranged to compare the first signature data and the second signature data in order to verify if the item output is the, or an, item retracted.

Such a verification of the retracted item allows the verification unit to determine if the item output has been swapped by the user, or a third party.

The pre-determined condition may comprise the expiry of a pre-determined timeout period.

The signature unit may be arranged to generate respective first and second signature data for each of a plurality of items output and retracted by the dispense unit. The processor may be arranged to compare the respective first signature data and the second signature data of each of the plurality of items in order to verify if each of the plurality of items retracted is one of the plurality of items output.

The verification of multiple retracted items allows the verification unit to determine if the substitution of an item offered for collection to the user has occurred.

The processor may be arranged to route the item to a retract bin, should the comparison of first and second signature data indicate that the item retracted is different from the item output. Alternatively, or additionally, the processor may be arranged to route the item to a dispense bin to be dispensed in response to a further user request, should the comparison of first and second signature data indicate that the item retracted is the same as the item output.

The selective routing of items to retract and dispense bins can increase the time between replenishments of the self-service terminal, for example an ATM, by reusing items that have been issued previously but not collected by a user.

The processor may maintain log data of output and retraction events executed by the media handling unit. The processor may be arranged to correlate the comparison of the first and second signature data with the log of output and retraction events. The processor may be arranged to communicate with a financial institution's server and may further be arranged to instruct crediting of the user's account in accordance with a portion of the log data corresponding to an incomplete transaction executed by the user, should the comparison of first and second signature data indicate that the item retracted is the same as the item output.

The automatic crediting of a user's account once an incomplete transaction has been verified simplifies the re-crediting process for the user and also reduces the likelihood of human error in the re-crediting process.

According to a second aspect of the present invention there is provided an item verification method comprising the steps of;

i) generating first signature data associated with an item to be output, the first signature data characterizing the item to be presented to a user;

ii) dispensing the item, such that the item is collectable by a user;

iii) instructing the retraction of the item in response to a pre-determined condition being met;

iv) retracting the, or an, item such that the, or an, item cannot be collected by the user;

v) generating second signature data, the second signature data characterizing the, or an, item retracted; and vi) comparing the first signature data and the second signature data in order to verify if the item output is the, or an, item retracted.

The pre-determined condition met in step (iii) may comprise the expiry of a pre-determined timeout period.

The method may comprise generating respective first and second signature data for each of a plurality of items output and retracted by the media handling unit. The method may comprise comparing the respective first signature data and the second signature data of each of the plurality of items in order to verify if each of the plurality of items retracted is one of the plurality of items output.

The method may comprise to routing the item to a retract bin, should the comparison of first and second signature data indicate that the item retracted is different from the item output. Alternatively, or additionally, the method may comprise to routing the item to a dispense bin to be dispensed in response to a further user request, should the comparison of first and second signature data indicate that the item retracted is the item output.

The method may comprise correlating the comparison of step (vi) with entries in a log of output and retraction events. The method may comprise crediting of the user's account in accordance with a portion of the log data corresponding to an incomplete transaction executed by the user, should the comparison of first and second signature data indicate that the item retracted is the same as the item output.

According to a third aspect of the present invention there is provided software, which when executed upon a processor, causes the processor to:

receive first signature data characterizing an item dispensed by a media handling unit;

instruct the media handling unit to retract an item offered for collection by a user, upon the expiry of a pre-determined timeout period;

receive second signature data, the second signature data characterizing the, or an, item retracted by the media handling unit; and compare the first signature data and the second signature data in order to verify if the item output is the, or an, item retracted.

The software, when executed, may cause the processor to compare the respective first signature data and the second signature data of each of a plurality of items in order to verify if each of the plurality of items retracted is one of the plurality of items output.

The software, when executed, may cause the processor instruct devices to route the item to a retract bin, should the comparison of first and second signature data indicate that the item retracted is different from the item output. Alternatively, or additionally, the software, when executed, may cause the processor to instruct devices to route the item to a dispense bin to be dispensed in response to a further user request, should the comparison of first and second signature data indicate that the item retracted is the same as the item output.

The software, when executed, may cause the processor to maintain log data of output and retraction events executed by the media handling unit. The software, when executed, may cause the processor to correlate the comparison of the first and second signature data with the log of output and retraction events. The software, when executed, may cause the processor to communicate with a financial institution's server and may further be arranged to instruct crediting of the user's account in accordance with a portion of the log data corresponding to an incomplete transaction executed by the user, should comparison of the respective first and second signature data indicate that the item retracted is the same as the item output.

According to a fourth aspect of the present invention there is provided software which, when executed upon a processor, causes the processor to:

generate first signature data associated with an item to be output via a media handling unit, the first signature data characterizing the item to be output; and generate second signature data, the second signature data characterizing the, or an, item retracted from the media handling unit.

The software, when executed, may cause the processor to pass the first signature data to a further processor. The software, when executed, may cause the processor to pass the second signature data to a further processor.

The software, when executed, may cause the processor to generate respective first and second signature data for each of a plurality of items output and retracted at the media handling unit.

It will be appreciated that, as used herein, the term "user" refers to a person using a self-service terminal to conduct a transaction or receive information.

BRIEF DESCRIPTION OF THE DRAWINGS

Embodiments of the present invention will now be described, by way of example only, with reference to the accompanying drawings, in which.

DETAILED DESCRIPTION OF EXEMPLARY EMBODIMENTS OF THE INVENTION

Figure 1:
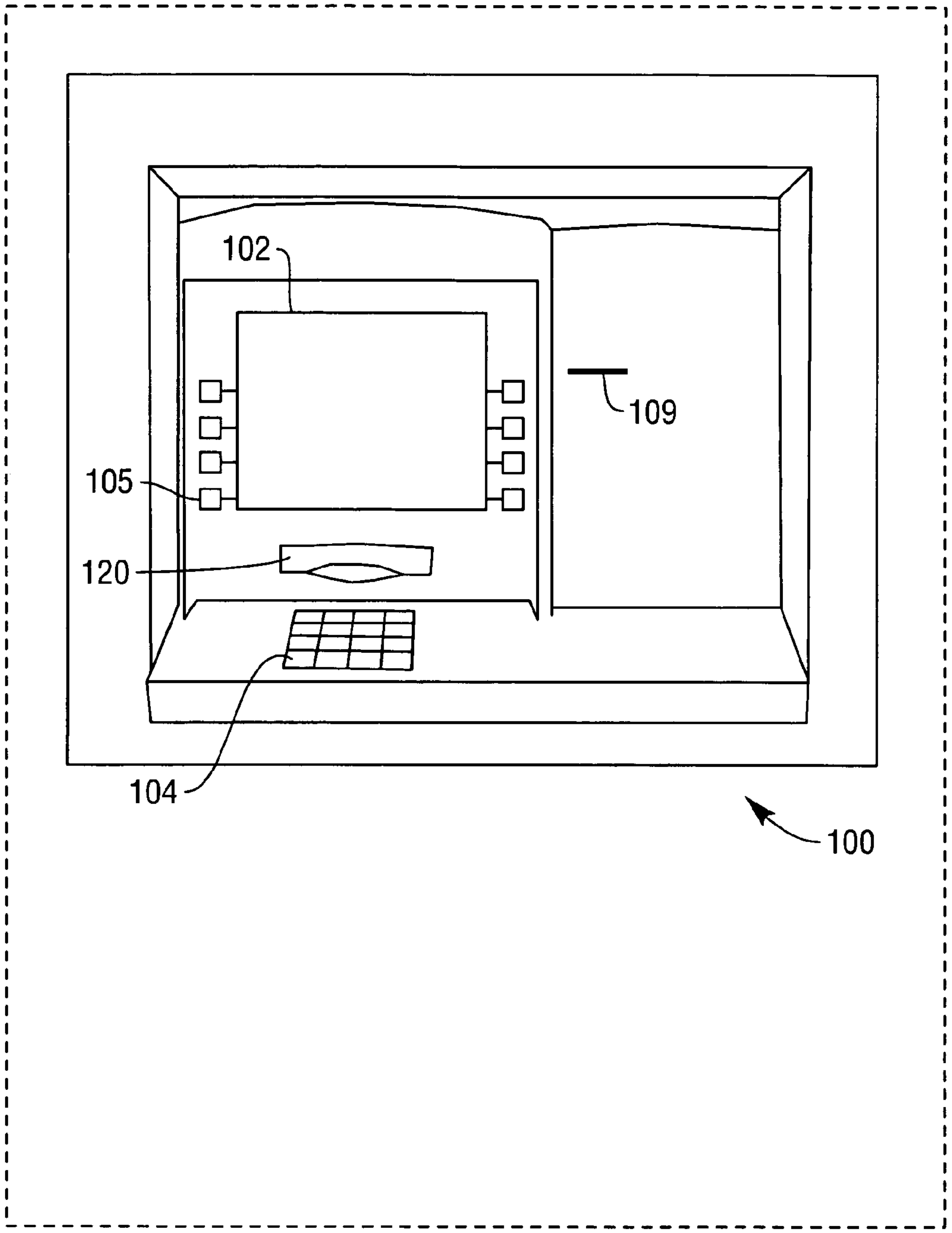
FIG. 1 is a schematic frontal elevation view of an ATM comprising an embodiment of an item verification apparatus according to an aspect of the present invention.
Figure 2:
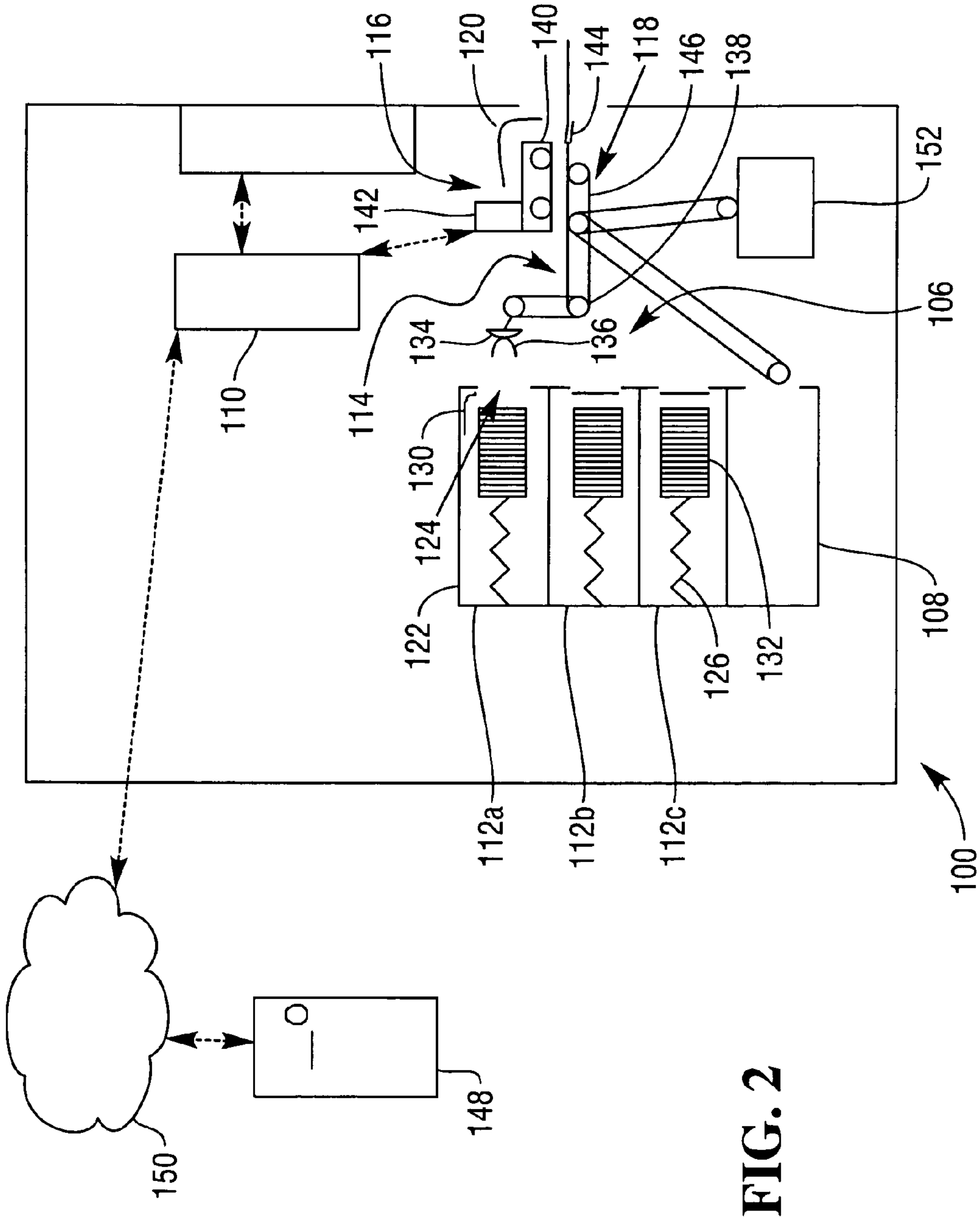
FIG. 2 is a schematic diagram of a network comprising the ATM of FIG. 1 and a server of a financial institution, showing selected internal components of the ATM.

Referring now to FIGS. 1 and 2, an ATM 100 comprises a screen 102, a keypad 104, function definition keys (FDKs) 105, a cash dispense module 106, a global bill recycling unit (GBRU) module 108, a card reader module 109 and a processor 110.

The cash dispense module 106 comprises a cassettes 112*a-c*, a pick mechanism 114, a signature generation device 116, a presentation mechanism 118 and a shutter mechanism 120.

Each of the cassettes 112*a-c* comprises a body 122 having a rectangular cross-section with an opening 124 through one end face of the body 122, an internal biasing component 126 and a pair of rectangular orifices (not shown) adjacent the opening 124. The opening 124 has a roller shutter 130 that is urged into a closed position. The biasing mechanism 126 urges bills 132 stored within the cassettes 112*a-c* towards the opening 124.

In the present embodiment, the pick mechanism 114 comprises D-shaped rollers 134, vacuum cups 136 and transport belts 138. The suction cups 136 are operably connected to a vacuum source (not shown).

The signature generation device 116 comprises an emitter-sensor array 140, typically infra-red LEDs and infra-red photosensors, and a comparison engine 142.

The presentation mechanism 118 comprises jaws 144 and a translation mechanism 146.

In use, a user inserts a card bearing identification data into the card reader module 109 and is prompted via the screen 102 to input their PIN via the keypad 104. Once the user's identity has been verified by checking that the PIN entered via the keypad 104 corresponds to that stored on the card read in the card reader module 109 the user is prompted via menu options displayed on the screen 102.

The menu options include dispensing of cash, the amount of cash to be dispensed is typically by depressing one of the FDKs 105, alongside which is displayed the desired amount of cash. The request for cash is passed from the ATM 100 to an authorization host 148 via a secure network 150. Typically, the authorization host 148 is operated by a financial institution and verifies whether the user has sufficient funds in their account to allow the requested amount of cash to be dispensed. Assuming that there are sufficient funds in the user's account the authorization host 148 authorizes the ATM 100 to dispense the desired amount of cash to the user, via the secure network 150.

When a cash cassette 112*a-c* is inserted in to the ATM 100 tines within the cash dispense module 106 locate in the orifices and cooperate with the roller shutter 130 to urge the roller shutter 130 into an open configuration. This provides access to the bills stored inside the cassette 112*a-c* for the pick mechanism 114. The processor 110 receives the authorization from the authorization host (not shown) and instructs the cash dispense module 106 to dispense desired amount of cash to the user in suitable denominations. For example, a user may request $50, the processor 110 can instruct the dispense module 106 to dispense five $10 bills, two $20 bills and one $10, one $20 bill and three $10 bills or a single $50. Each cassette 112*a-c* stores a different denomination and the pick mechanism 114 must be instructed which of the cassettes 112*a-c* to access to dispense the processor's preferred denominations of bills to the user.

In the present embodiment, the pick mechanism 114 picks the bills from the open cassettes 112*a-c* by means of the suction cups 136. The transport belts 134 transport each of the picked bills from the cassettes 112*a-c* to the signature generation device 116 where the emitter-sensor array 140 is activated and collects dispense signature data about each bill that is passed to the comparison engine 142. Typical signature data collected about each bill includes, but is not limited to, any one, or combination of the size or dimensions of the bill, the opacity of the media comprising the bill, a scanned image of the bill, a scan of a barcode, a codeline associated with the bill, a serial number associated with the bill. Other features of a bill that can be detected and used in addition, or as alternatives, to the above include intaglio ink, raised portions, covert markings, magnetic portions, foils, or the like.

Once the dispense signature data is captured and stored in the comparison engine 142 the bills are passed to the presentation mechanism 118. Typically, the bills are bunched prior to being dispensed to the user. However, it will be appreciated that the present invention is equally applicable to dispense units that dispense bills singly.

The bunched bills are gripped by the jaws 144 and the shutter 120 lifts to open. The translation mechanism 146 moves the jaws 144 forward such that the bills pass through the opening left by the lifted shutter 120. The bills are presented to the user to be removed from the jaws 144.

Usually, the user will remove the bills and the jaws 144 will by translated back to their resting position within the body of the ATM 100 and the shutter 120 will drop closed. However, there are instances where the user forgets to take the bills or takes too long to take the bills. In these instances a predetermined time-out threshold is exceeded and the processor 110 instructs the presentation mechanism 118 to retract the bills and further instructs the shutter 120 to drop closed. In such an instance there is the possibility that one or more of the bills may have been removed, or substituted for a fake bill or a bill of a different denomination.

Upon retraction of the bills they are separated and passed, individually, to the signature generation device 116 where retract signature data is acquired for each retracted bill. Each set of retract signature data is stored at the comparison engine 142.

The comparison engine 142 compares the dispense and retract signature data sets for each piece of media in order to determine whether the retracted media is the same as the dispensed bills.

It will be appreciated that in one embodiment the order of dispense of bills is noted and only the dispense and retract signature data of corresponding bills will be compared. For example, the last bill dispensed is the first bill to have its signature acquired upon retraction, accordingly the comparison engine 142 compares the last dispense signature data set to only the first retract signature data set.

However, in another embodiment, the retract signature data set of each piece of retracted media is compared to the dispense signature data of every dispensed bill. This arrangement may be employed where the ordering of the dispensed bills is not known, or where such a thorough comparison is desired for any other suitable reason.

If the comparison of the signature data of any piece of the retracted media and the signature data of one of the output bills indicates that they are the same that piece of the retracted media is returned to the GBRU module 108. Once in the GBRU module 108 the bill is assigned to the appropriate cassette 112*a-c* for re-dispensing. The user's account can be re-credited for any bills that they did not remove where the dispense and retract signature data sets match each other. This removes the requirement of a user having to specifically request such a re-crediting of their account and relieves the financial institution of the burden of carrying out a manual reconciliation of the ATM activity in order to be able to accurately re-credit a user's account.

Should the comparison of the signature data of any piece of the retracted media not match the signature data of one of the dispensed bills that piece of the retracted media is routed to a quarantine bin 152 where it is held for further review.

It will be appreciated that the comparison engine 142 may run on the processor 110, or it may run on a separate processor associated with the cash dispense unit 106.

Figure 3:
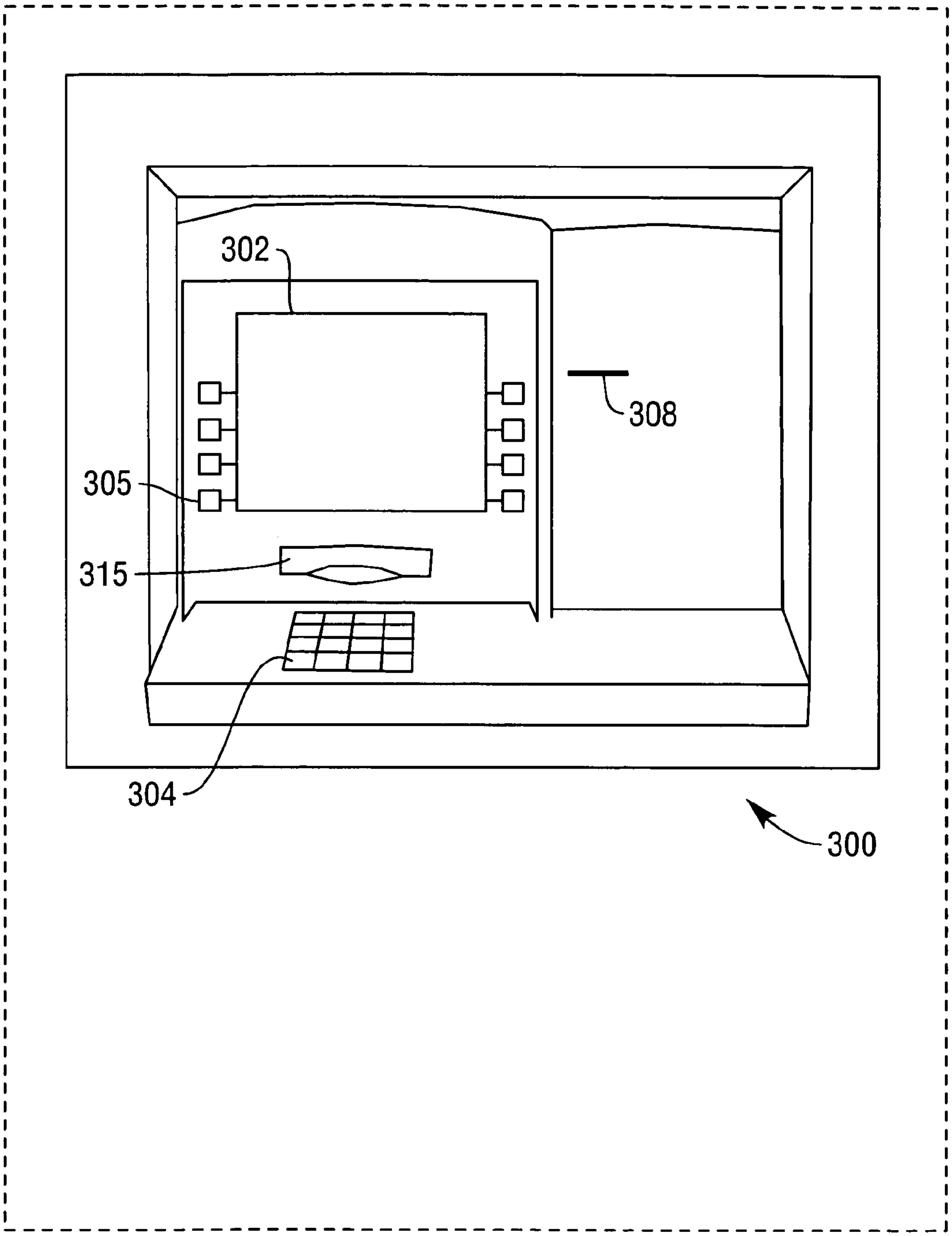
FIG. 3 is a schematic frontal elevation view of a self-service deposit terminal comprising an embodiment of an item verification apparatus according to an aspect of the present invention.
Figure 4:
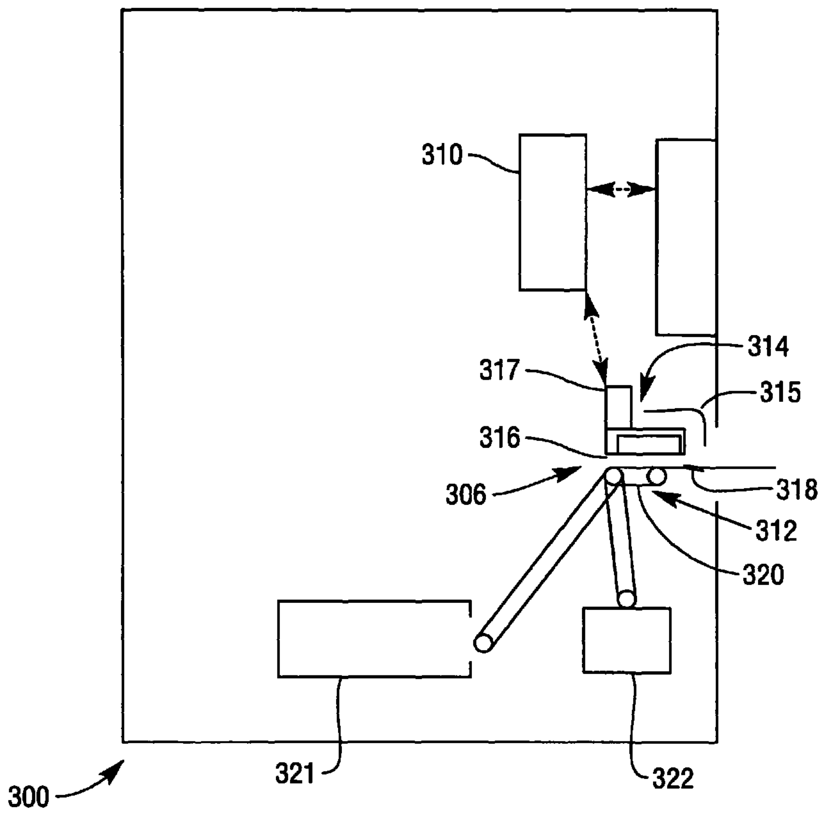
FIG. 4 is a schematic diagram of selected internal components of the self-service deposit terminal of FIG. 3.

Referring now to FIGS. 3 and 4, a self-service deposit terminal 300 comprises a screen 302, a keypad 304, function definition keys (FDKs) 305, a deposit input module 306, a card reader module 308 and a processor 310.

The deposit input module 306 comprises a receipt mechanism 312, a signature generation device 314, and a shutter 315.

The signature generation device 314 comprises sensor array 316 and a comparison engine 317. In some embodiments, the sensor array 316 will comprise a magnetic ink character recognition (MICR) sensor array that is designed to recognize characters printed upon media, for example cheques, by means of a magnetic signature associated with magnetic particles in the ink used to print the characters. In other embodiments, the sensor array 316 comprises an optical character recognition (OCR) sensor array which recognizes characters upon media due to contrast between the character outline and the media upon which they are printed. Typically, where an OCR sensor array is used an illumination source is employed to illuminate the media. In this instance the OCR sensor array and illumination source combination is similar to the emitter-sensor arrangement of FIG. 1. However, the illumination source and the photo-detectors are typically operable in the visible portion of the electromagnetic spectrum, although operation in the infra-red portion of the electromagnetic spectrum is possible. In the present embodiment, the sensor array 316 will be described in relation to an MICR sensor array.

The receipt mechanism 312 comprises jaws 318 and a translation mechanism 320.

In use, a user inserts a card bearing identification data into the card reader module 308 and is prompted via the screen 302 to input their PIN via the keypad 304. Once the user's identity has been verified by checking that the PIN entered via the keypad 304 corresponds to that stored on the card read in the card reader 308 the user is prompted via menu options displayed on the screen 302.

The menu options include the deposit of media, for example cheques or cash. The deposit of media is selected by depressing one of the FDKs 305, alongside which is displayed the deposit option. Once the deposit option is selected the shutter 315 of the deposit input module 306 opens, and the translation mechanism 320 presents the jaws 318 to receive the cheque, or cheques to be deposited. The deposit input module 306 can be one of a number of types, for example, a single item input unit that can accept and process a single cheque or bills at a time, a multi-item feed with no stacker that can accept a number of cheques or bills and where each item must be either deposited in a bin or returned to the user before the next item can be processed, or a multi-item feed with a stacker that can accept a number of bills or cheques at once, and where all items are processed in parallel. It will be appreciated that the present invention is applicable to any of the three types of deposit input modules 306 described above, or the instance where bills and cheques make up a composite bunch deposit.

The translation mechanism 320 draws the media into the deposit terminal 300 and the shutter 315 closes. The media passes to the signature generation device 314 where initial deposit signature data is captured by the sensor array 316. Examples of signature data captured by the sensor array 316 include, but are not limited to, any one or combination of the following: an image of the front or rear of an item in multiple formats and bit depths, the code line of an item read using MICR reader and the code line of an item read using OCR.

Should an item of media need to be re-output to the user the media is gripped by the jaws 318 and the shutter 315 lifts to open.

The translation mechanism 320 moves the jaws 318 forward such that the media passes through the opening left by the lifted shutter 315 for removal by the user.

Usually, the user will remove the media, sensed by the closure of the jaws 318, and the jaws 318 translate back to their resting position within the deposit terminal 300. In this instance, the shutter 315 closes. However, there are instances where the user forgets to remove the media or takes too long to take the bills. In these instances a pre-determined time-out threshold is exceeded and the processor 310 instructs the receipt mechanism 312 to retract the media and further instructs the shutter 315 to close. In such an instance there is the possibility that one or more of the pieces of media may have been removed, or substituted.

Upon retraction of the media, the individual pieces of media are separated if there is more than one. Each piece of media is then passed, individually, to the signature generation device 314 where retract signature data is acquired for each retracted bill, in the manner disclosed above in relation to the deposit signature data.

Typically, the retract signature data is stored at the comparison engine 317.

The comparison engine 317 compares the deposit and retract signature data sets for each piece of media in order to determine whether the retracted media is the same as those initially deposited by the user.

If the comparison of the signature data of any piece of the retracted media and the signature data of one of the output pieces of media indicates that they are the same, the retracted media is endorsed as the previously presented piece of media. If possible the deposit process for the retracted piece of media continues as normal and the media is deposited in a deposit bin 321. If this is not possible, the retracted media is placed in a purge bin and this event is noted as a journal event in the processor 310 along with details of the transaction associated with the piece of media and also the location of the media following retraction.

Should the comparison of the signature data of any piece of the retracted media not match the signature data of one of the output media that piece of the retracted media is routed to a quarantine bin 322 where it is held for further manual assessment. This event is noted as a journal event in the processor 310 along with details of the transaction associated with the piece of media and also the location of the media following retraction.

It will be appreciated that although described with reference to separate self-service terminals for cash dispense and cheque or cash deposit operations the two functions may be combined in a suitable self-service terminal, for example an NCR® SelfServ™ 32 ATM manufactured by NCR Corporation of Dayton, Ohio, USA.

Figure 5:
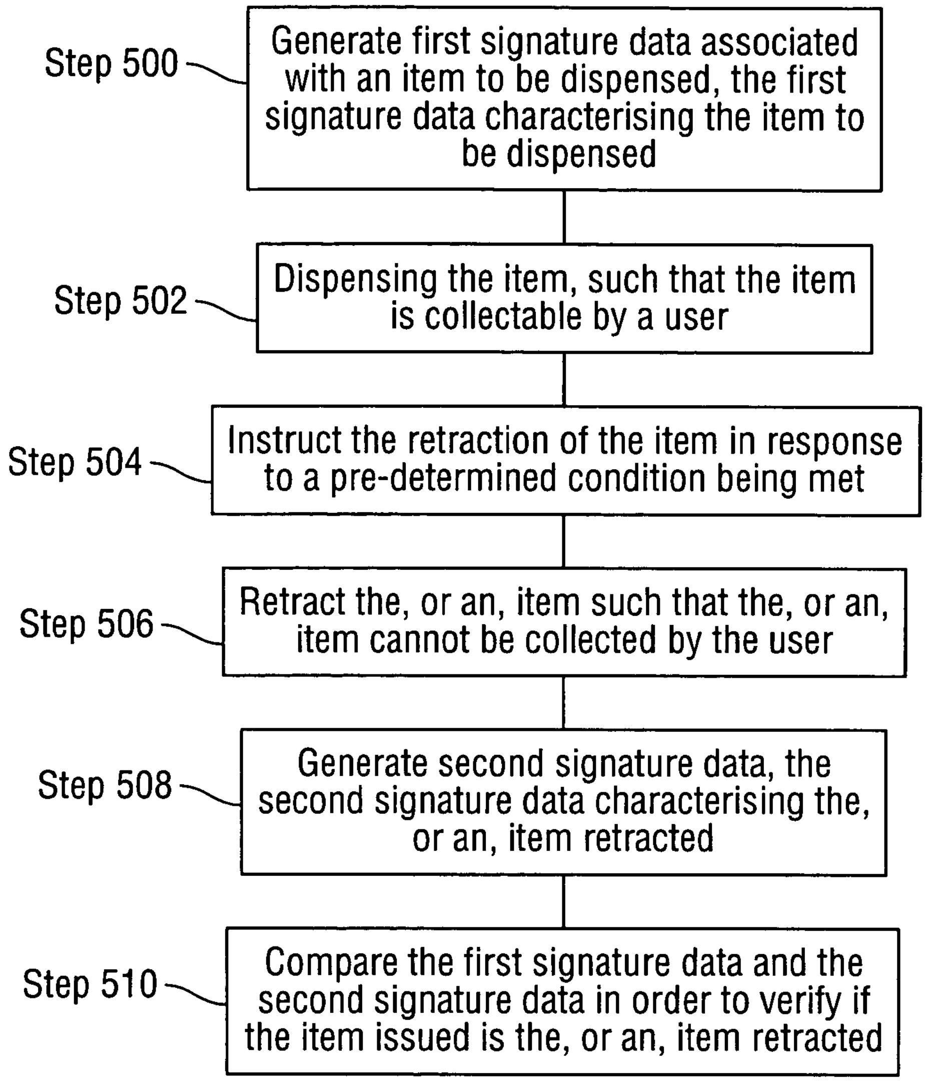
FIG. 5 is a flow chart detailing the steps of a method of item verification according to a further aspect of the present invention.

Referring now to FIG. 5, a method of item verification comprises generating a first set of signature data that characterizes an item to be output to a user (Step 500). The item is output such that it is collectable by the user (Step 502). The retraction of the item is instructed in response to a pre-determined condition being met (Step 504), for example the failure of the user to collect the item within a time-out period. The, or an, item is retracted such that it cannot be collected by the user (Step 506). A second set signature data that characterizes the item retracted is generated (Step 508). The first signature data and the second signature data are compared in order to verify if the media item output is the item retracted (Step 510).

It will be further appreciated that the present invention is not limited to use with cash or cheques but can be used with any item that is dispensed or deposited at a self-service terminal, for example coupons, coins or cards such as loyalty cards or keycards.

Various modifications may be made to the above described embodiments within the scope of the present invention.

The invention claimed is:

1. An item verification apparatus comprising:

a processor;

a media handling unit; and a signature unit;

the signature unit being arranged to generate first signature data for each item of a plurality of items to be output via the media handling unit, the first signature data characterizing the items to be presented to a user, the signature unit being arranged to pass the first signature data to the processor;

the media handling unit being arranged to bunch and output the items from the signature unit as a bunch collectable by the user;

the processor being arranged to issue an instruction to the media handling unit to retract the items in response to a pre-determined condition being met;

the media handling unit being arranged to perform a retraction upon receipt of said instruction;

wherein the signature unit is arranged to generate second signature data from unbunched items following the retraction, the second signature data characterizing each item retracted, the signature unit being arranged to pass the second signature data to the processor; and the processor is arranged to compare the first signature data and the second signature data for each of the items in order to verify if the items output are the items retracted, wherein the processor is arranged to route the items to a dispense location to be dispensed in response to a further user request, should the comparison of first and second signature data indicate that the items retracted are the same as the items dispensed, and the processor arranged to detect that at least one item from the bunch was retained by the user but not all items from the bunch, and the processor further arranged to credit an account of the user for those items not retained by the user and wherein each of those items not retained by the user are validated to detect any of those items which may be fake before the account is credited for the user.

2. Apparatus according to claim 1, wherein the plurality of items are items of currency, and the processor is arranged to compare the respective first signature data and the second signature data of each of the plurality of items in order to verify if each of the plurality of items retracted is one of the plurality of items output, and each item so verified is assigned to an appropriate cassette for dispensing.

3. Apparatus according to claim 1, wherein the processor is arranged to route the items to a holding location, should the comparison of first and second signature data indicate that the items retracted are different from the items output.

4. Apparatus according to claim 1, wherein the first and second signature data comprises at least one of the following: scanned images of the items, scans of barcodes, codelines associated with the items, dimensions of the items, serial numbers associated with the items.

5. Apparatus according to claim 1, wherein the processor is arranged to generate location data dependent upon the destination of the items following the comparison of the first signature data and the second signature data.

6. Apparatus according to claim 1, wherein the processor is arranged to maintain log data of dispense and retraction events executed by the media output unit.

7. Apparatus according to claim 6, wherein the processor is arranged to correlate the comparison of the first and second signature data with the log of media output and retraction events.

8. Apparatus according to claim 7, wherein the processor is arranged to communicate with a financial institution's server and is further arranged to instruct crediting of the user's account in accordance with a portion of the log data corresponding to an incomplete transaction executed by the user, should the comparison of first and second signature data indicate that the item retracted is the same as the item output.

9. An item verification method comprising the steps of;

generating first signature data associated with each item of a plurality of items to be output, the first signature data characterizing the items to be presented to a user;

bunching the items from the signature unit into a bunch;

dispensing the bunch of the items, such that the bunch of the items is collectable by a user;

instructing the retraction of the bunch of the items in response to a pre-determined condition being met;

performing the retraction;

generating second signature data from unbunched items following the retraction, the second signature data characterizing each item retracted;

comparing the first signature data and the second signature data for each of the items in order to verify if the items output are the items retracted;

routing the items to a dispense location to be dispensed in response to a further user request, should the comparison of first and second signature data indicate that the items retracted are the items output; and detecting that at least one item from the bunch was retained by the user but not all items from the bunch, and crediting an account of the user for those items not retained by the user by validating each of those items not retained by the user and detecting any of those items which may be fake before the account is credited for the user.

10. The method of claim 9 comprising comparing the respective first signature data and the second signature data of each of the plurality of items in order to verify if each of the plurality of items retracted is one of the plurality of items output.

11. The method of claim 9 comprising routing the items to a holding location, should the comparison of first and second signature data indicate that the items retracted are different from the items output.

12. The method of claim 9, wherein the first and second signature data comprise at least one of the following: scanned images of the items, scans of barcodes, codelines associated with the items, dimensions of the items, serial numbers associated with the items.

13. The method of claim 9 comprising generating location data dependent upon the destination of the items following the comparison of the first signature data and the second signature data.

14. The method of claim 9 comprising correlating the comparing with entries in a log of media output and retraction events.

15. The method of claim 14 comprising crediting of the user's account in accordance with a portion of the log data corresponding to an incomplete transaction executed by the user, should the comparison of first and second signature data indicate that the items retracted are the same as the items output.

16. An item verification apparatus comprising:

a processor;

a media handling unit; and a signature unit;

the signature unit being arranged to generate first signature data for each item of a plurality of items to be output via the media handling unit, the first signature data characterizing the items to be presented to a user, the signature unit being arranged to pass the first signature data to the processor;

the media handling unit being arranged to output the items such that the items are collectable by the user;

the processor being arranged to issue an instruction to the media handling unit to retract the items in response to a predetermined condition being met;

the media handling unit being arranged to perform a retraction upon receipt of said instruction;

wherein the signature unit is arranged to generate second signature data, the second signature data characterizing each item retracted, the signature unit being arranged to pass the second signature data to the processor;

the processor is arranged to compare the first signature data and the second signature data for each of the items in order to verify if the items output are the items retracted; and wherein the processor is arranged to route the items to a dispense location to be dispensed in response to a further user request, should the comparison of first and second signature data indicate that the items retracted are the same as the items dispensed, and the processor arranged to detect that at least one item from the bunch was retained by the user but not all items from the bunch, and the processor further arranged to credit an account of the user for those items not retained by the user and wherein each of those items not retained by the user are validated to detect any of those items which may be fake before the account is credited for the user.

17. An item verification method comprising the steps of;

generating first signature data associated with each item of a plurality of items to be output, the first signature data characterizing the items to be presented to a user;

dispensing the items, such that the items are collectable by a user;

instructing the retraction of the items in response to a pre-determined condition being met;

performing the retraction;

generating second signature data, the second signature data characterizing each item retracted;

comparing the first signature data and the second signature data for each of the items in order to verify if the items output are the items retracted; and routing the items to a dispense location to be dispensed in response to a further user request, should the comparison of first and second signature data indicate that the items retracted are the items output; and detecting that at least one item from the plurality of items was retained by the user but not all items from the plurality of items, and crediting an account of the user for those items not retained by the user by validating each of those items not retained by the user and detecting any of those items which may be fake before the account is credited for the user.

18. An item verification apparatus comprising:

a processor;

a transport;

a media handling unit; and a signature unit comprising an emitter and sensor array;

the signature unit being arranged to generate first signature data comprising a combination of size or dimension data, opacity data, and scanned image data for each item of a plurality of items as the transport transports the items one by one past the signature unit, the first signature data characterizing the items to be presented to a user, the signature unit being arranged to pass the first signature data to the processor;

the media handling unit being arranged to output the items such that the items are collectable by the user;

the processor being arranged to issue an instruction to the media handling unit to retract the items in response to a predetermined condition being met;

the media handling unit being arranged to perform a retraction upon receipt of said instruction;

wherein the signature unit is arranged to generate second signature data as the transport transports retracted items one by one past the signature unit, the second signature data characterizing each of the retracted items, the signature unit being arranged to pass the second signature data to the processor; and the processor is arranged to compare the first signature data and the second signature data for each of the items in order to verify if the items output are the items retracted, and the processor arranged to detect that at least one item from the items was retained by the user but not all items, and the processor further arranged to credit an account of the user for those items not retained by the user and wherein each of those items not retained by the user are validated to detect any of those items which may be fake before the account is credited for the user.

19. Apparatus according to claim 18, wherein the processor is arranged to route the items to a dispense location to be dispensed in response to a further user request, should the comparison of first and second signature data indicate that the items retracted are the same as the items dispensed.

20. Apparatus according to claim 18, wherein the plurality of items are items of currency, and the processor is arranged to compare the respective first signature data and the second signature data of each of the plurality of items in order to verify if each of the plurality of items retracted is one of the plurality of items output, and each item so verified is assigned to an appropriate cassette for dispensing.

* * * * *